United States Patent
Veis (10) Patent No.: US 10,389,914 B2
(45) Date of Patent: Aug. 20, 2019

(54) INK-OPTIMIZED HALFTONE SCREEN (71) Applicant: HP SCITEX LTD., Netanya (IL)

(72) Inventor: Alex Veis, Kadima (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 15/991,118

(22) Filed: May 29, 2018

(65) Prior Publication Data

US 2019/0037108 A1     Jan. 31, 2019

(30) Foreign Application Priority Data

Jul. 26, 2017   (EP) ..................................... 17183320

(51) Int. Cl.
    *H04N 1/405*      (2006.01)
    *H04N 1/52*      (2006.01)
    *B41J 2/21*      (2006.01)
    *H04N 1/48*      (2006.01)

(52) U.S. Cl.
    CPC .............. *H04N 1/52* (2013.01); *B41J 2/2132* (2013.01); *H04N 1/405* (2013.01)

(58) Field of Classification Search
None
See application file for complete search history.

(56) References Cited

U.S. PATENT DOCUMENTS

| | | | |
|---|---|---|---|
| 5,416,612 A | 5/1995 | Ingraham et al. | |
| 5,848,224 A | 12/1998 | Nhu | |
| 5,949,966 A * | 9/1999 | Hayashi | H04N 1/4105 358/1.9 |
| 7,199,888 B2 | 4/2007 | Parker et al. | |
| 7,394,571 B2 | 7/2008 | Harrington | |
| 7,417,771 B2 | 8/2008 | Chang | |
| 2003/0128395 A1 | 7/2003 | Sharma et al. | |
| 2011/0141503 A1 | 6/2011 | Blum | |
| 2017/0310852 A1* | 10/2017 | Quintana | H04N 1/52 |

FOREIGN PATENT DOCUMENTS

EP     2003870     12/2008
WO     WO-2013054319     4/2013

OTHER PUBLICATIONS

Ostromoukhov, V. et al., Multi-level Colour Halftoning Algorithms, Oct. 1996 < https://liris.cnrs.fr/victor.ostromoukhov/publications/pdf/Berlin96_MultiLevel.pdf >.

* cited by examiner

*Primary Examiner* — Dov Popovici
(74) *Attorney, Agent, or Firm* — HP Inc. Patent Department (57) ABSTRACT

A method of generating data representing a halftone screen includes generating tonal data of a first colorant for a plurality of pixels according to a darkness level by assigning a tonal value to at least a first subset of the plurality of pixels, wherein the tonal value takes a value equal to any of a plurality of ordered tonal values. A difference between a maximal tonal value and a minimal tonal value assigned to pixels of the first subset is equal to or smaller than a predefined threshold. For a given darkness level, a number of pixels with the minimal tonal value is maximized. The darkness level is related to a ratio of a sum of tonal values of all pixels of the plurality of pixels to a number of pixels of the plurality of pixels.

15 Claims, 5 Drawing Sheets

|   |   |   |   |   |   |   |   |   |   |   |   |
|---|---|---|---|---|---|---|---|---|---|---|---|
| 1 |   |   |   | 1 |   |   |   | 1 | 1 |   |   |
|   | 1 | 1 |   | 1 |   | 1 | 1 |   |   |   |   |
|   | 1 | 1 |   |   |   |   |   | 1 | 1 | 1 | 1 |
|   |   |   | 1 |   | 1 | 1 |   |   |   |   |   |
|   | 1 |   |   |   | 1 |   | 1 | 1 | 1 | 1 |   |
| 1 | 1 |   |   | 1 |   | 1 |   |   |   |   |   |
|   | 1 | 1 |   |   | 1 |   | 1 | 1 | 1 | 1 |   |
|   |   | 1 |   |   |   |   |   |   |   |   |   |
| 1 |   | 1 |   |   |   | 1 |   |   | 1 |   |   |
|   | 1 |   | 1 |   | 1 |   |   | 1 | 1 |   |   |
|   |   |   | 1 | 1 |   | 1 |   |   | 1 | 1 |   |
|   | 1 |   | 1 |   |   | 1 |   | 1 |   |   |   |

Fig. 3

|   |   |   |   |   |   |   |   |   |   |   |   |
|---|---|---|---|---|---|---|---|---|---|---|---|
|   |   |   |   |   |   |   |   |   |   |   |   |
|   | 2 | 2 |   |   | 2 | 2 |   |   | 2 | 2 |   |
|   |   | 2 |   |   |   | 2 |   |   |   | 2 |   |
|   |   |   |   |   |   |   |   |   |   |   |   |
|   |   |   |   |   |   |   |   |   |   |   |   |
|   | 2 |   |   |   | 2 | 2 |   |   | 2 | 2 |   |
|   | 2 | 2 |   |   |   | 2 |   |   |   | 2 |   |
|   |   |   |   |   |   |   |   |   |   |   |   |
|   |   |   |   |   |   |   |   |   |   |   |   |
|   | 2 | 2 |   |   | 2 |   |   |   | 2 | 2 |   |
|   | 2 | 1 |   |   | 2 | 2 |   |   |   | 2 |   |
|   |   |   |   |   |   |   |   |   |   |   |   |

INK-OPTIMIZED HALFTONE SCREEN

BACKGROUND

A printing system may combine one or more colorants, such as a black colorant together with cyan, magenta and yellow colorants for printing different colors according to a subtractive color model, by distributing dots of the different colorants over a printing medium according to different densities. The dots are of a size small enough for the human eye to perceive the resulting pattern as a solid color. Lighter colors may be generated by printing a smaller density of colorant and darker colors may be generated by printing a greater density of colorant, such as a greater density of black colorant in combination with the desired proportions of the remaining colorants. The density of a given colorant may be defined as the number of depositions of colorant that are placed per unit area or pixel of a printing medium. The colorants may be in the form of a printing fluid, like e.g. ink, in which case a colorant deposition may correspond to a drop of printing fluid, or of a printing powder, like e.g. toners, in which case a colorant deposition may correspond to a powder particle.

DETAILED DESCRIPTION

A method of generating data representing a halftone screen according to the present disclosure comprises generating tonal data of a first colorant for a plurality of pixels according to a darkness level by assigning a tonal value to at least a first subset of the plurality of pixels. A halftone screen refers herein to a dataset that encodes information regarding the distribution of colorant over the surface of a printing medium to be printed. The surface may be divided in pixels, which represent the smallest controllable element of the halftone screen for which information may be encoded. There may be a 1-to-1 correspondence between pixels of the halftone screen and pixels of the printing medium, such that one pixel of the halftone screen may represent one pixel of the printing medium, i.e. an addressable location of the printing medium. However, other correspondences between pixels of the halftone screen and pixels of the printing medium are also possible and included in this disclosure.

The "darkness level" refers herein to the printing density of the first colorant to be printed on a printing medium according to the halftone screen, i.e. the number of colorant depositions of first colorant to be deposited or printed on the printing medium per pixel on average. For example, when the colorant corresponds to a printing liquid, the darkness level may be related to the number of drops of printing liquid that are to be printed per pixel on the printing medium. Thus, the darkness level is related to a ratio of the sum of the tonal values of all pixels of the plurality of pixels to the number of pixels of the plurality of pixels.

Figure 1:
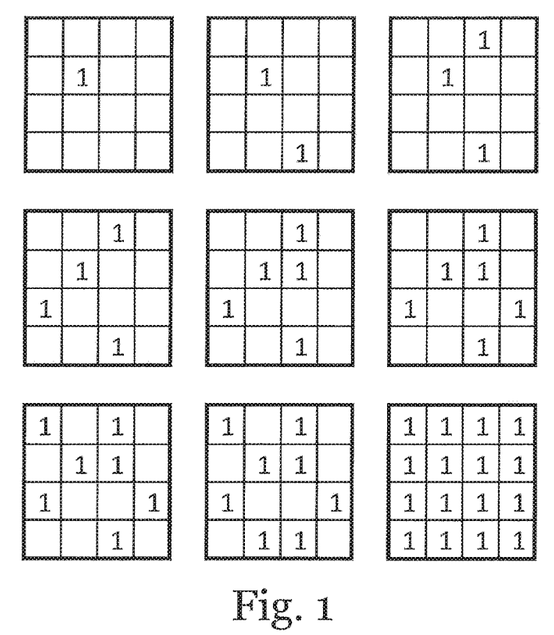
FIG. 1 is a schematic illustration of different darkness levels employed in halftoning printing methods according to an example.

FIG. 1 is a schematic illustration of different darkness levels employed in a comparative halftoning printing method shown herein for reference. Nine different darkness levels are illustrated in nine different squares, wherein each square represents a subregion of a halftone screen comprising 4×4 pixels. Each of the nine depicted squares may represent a corresponding part of a printing medium to be printed according to the halftone screen. The nine different darkness levels correspond to nine different printing densities of the first colorant to be printed on a printing medium.

The squares represented in the figures are merely illustrative examples. A real halftone screen usually comprises a large number of pixels and may be divided into a big number of squares like the ones represented in the figures. The squares shown in the figures stand for any subregion of a size such that partitioning a halftone screen in such squares allows for the generation of colors according to halftoning techniques. The squares may be chosen to have a size such that average quantities defined within a square are representative of average quantities defined for the entire halftone screen. For example, the ratio of the sum of the number of colorant depositions in all pixels within a square over the number of pixels in a square may equal the ratio of the sum of the number of colorant depositions in all pixels of the plurality of pixels over the number of pixels in the plurality of pixels, such that the printing density of the entire plurality of pixels may indistinguishably be defined with respect to a single square or with respect to a part of the halftone screen comprising a plurality of such squares.

The top left square corresponds to a first darkness level, which in the example shown is indicative of a printing density of 1/16 colorant depositions of first colorant per pixel (which may be referred to as "drops per pixel" or "dpp" given the possible equivalence between colorant depositions and drops of colorant in case the colorant corresponds to a printing liquid). The seven following squares in a left to right and top to bottom sequence each represent increasing darkness levels, which in the example shown respectively correspond to print ink densities of n/16 dpp, wherein n= 2, . . . , 8.

Each pixel of a first subset of the plurality of pixels is assigned a tonal value that may take a value equal to any of a plurality of ordered tonal values and may be related to a number of colorant depositions of first colorant to be printed in said pixel, such that for example, the greater the tonal value, the more colorant depositions of first colorant should be printed in the pixel. A tonal value of zero may indicate that no first colorant should be printed in that pixel at all. A tonal value of one may indicate that one colorant deposition of first colorant, for example one drop of printing liquid, is to be printed in the pixel. Thus, the tonal value may correspond to an integer value. However, the tonal value may also correspond to non-integer values and may correlate with the number of colorant depositions of colorant to be printed in a pixel other than linearly. The first subset of pixels of the plurality of pixels represents in the halftone screen a printing medium to be printed or a part thereof. The first subset may include the totality of the plurality of pixels and may or may not be a connected subset within the plurality of pixels.

Figure 2:
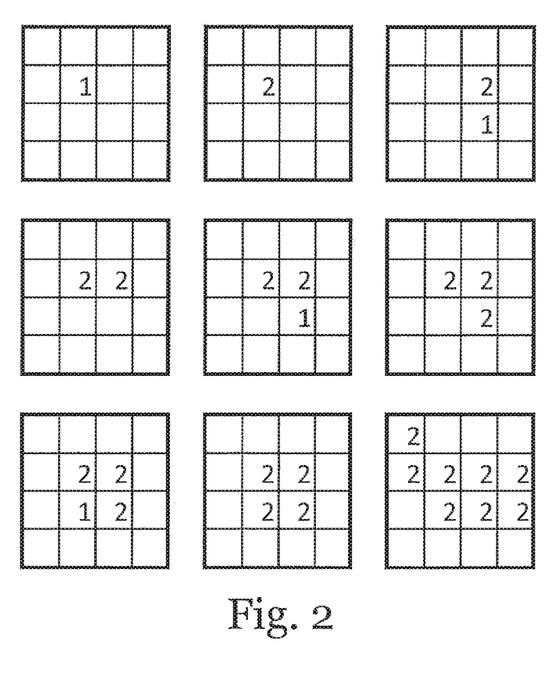
FIG. 2 is a schematic illustration of darkness levels employed in a method of generating data representing a halftone screen according to an example.

FIG. 2 is a schematic illustration of darkness levels employed in a method of generating data representing a halftone screen according to an example. In the example shown, the tonal value takes a value equal to any of 0, 1, 2, or 3. A tonal value of 0 is indicative of a pixel that is not to be printed with the first colorant. A tonal value of 1, 2, or 3 is respectively indicative of a pixel that is to be printed with 1, 2, or 3 colorant depositions of the first colorant, e.g. with 1, 2, or 3 drops of a printing liquid corresponding to the first colorant.

The first colorant may correspond to a black colorant. The darkness level may then correspond to different gray levels, wherein a maximum darkness level defined by a halftone screen in which all pixels are assigned a tonal value equal to the predefined maximal value may correspond to a part of the printing medium to be printed in black. A black colorant may be used as a basic outline in a subtractive color scheme in combination with further colorants.

The tonal value of a pixel may be equal to or smaller than a predefined maximal value, which in the example shown in FIG. 2 corresponds to a value of 3. This predefined maximal value may correspond to a maximum number of depositions of colorant that may be printed in a single pixel. This prevents situations in which to many colorant depositions per pixel may cause a printing medium to deteriorate.

A difference between a maximal tonal value and a minimal tonal value assigned to pixels of the first subset is equal to or smaller than a predefined threshold, which in the example shown in FIG. 2 corresponds to a value of 2. This means that no two pixels of the first subset may have tonal values differing by a value greater than the predefined threshold. The predefined threshold may be smaller than the predefined maximal value. In an example, no pixel may have a tonal value equal to the predefined maximal value as long as there is at least one pixel having a tonal value smaller than the predefined threshold. As seen in FIG. 2, the maximal tonal value assigned to a pixel is 1 in the top left square and 2 in all other squares, and the minimal tonal value assigned to a pixel is 0 in all squares (not explicitly shown, but rather indicated by the absence of any number). Thus the difference between the maximal tonal value and the minimal tonal value assigned to pixels of the first subset is in any case smaller than or equal to the predefined threshold of 2. Consequently no pixel has a tonal value of 3, which in the example shown corresponds to the predefined maximal value. In other words, pixels may be assigned a tonal value equal to the predefined maximal value if no pixels having a tonal value smaller or equal than the predefined threshold are available. In the example of FIG. 2 a pixels may be assigned a tonal value of 3 when all pixels have a tonal value of at least 2 and may be not assigned a tonal value of 3 in all other cases.

Further, for a given darkness level, a number of pixels with the minimal tonal value is maximized. In other words, in order to distribute tonal values over the pixels according a given target darkness level, the distribution according to the example of FIG. 2 corresponds to a distribution in which fewer pixels have higher tonal values in comparison to the distribution of the comparative example of FIG. 1, in which more pixels have smaller tonal values. This means, for instance, that when increasing the darkness level, the tonal value of pixels having a tonal value greater than the minimal tonal value are increased before increasing the tonal value of pixels having the minimal tonal value. Thus, for a given darkness level, the tonal values are distributed over the pixels according to the method of FIG. 2 in a way that maximizes the number of pixels having the minimal tonal value of 0.

A pixel having a tonal value greater than the minimal tonal value assigned to pixels of the first subset is adjacent to a pixel having at least the same tonal value. In the example shown in FIG. 2, pixels having a tonal value greater than the minimal tonal value of 0 are adjacent to a pixel having at least the same tonal value. For example, pixels having a tonal value of 1 are adjacent to pixels having a tonal value of 2 and pixels having a tonal value of 2 are adjacent to pixels also having a tonal value of 2. Thus, the same darkness levels shown in the comparative example of FIG. 1 can be represented by halftone screens in which the number of pixels having the minimal tonal value of 0 is maximized.

Thus, as seen in FIG. 2, the pixels having a tonal value greater than the minimal tonal value, of 0 form connected "clusters" of pixels or "dots", in the sense that each pixel having a tonal value greater than the minimal tonal value of 0 is directly adjacent to another pixel having a tonal value greater than the minimal tonal value of 0. This is not the case in the comparative examples of FIG. 1. As a consequence, the method according to the example illustrated in FIG. 2 allows printing bigger connected groups of pixels or dots of a further colorant. "Connected" refers herein to a group of directly adjacent pixels having a tonal value greater than the minimal tonal value within a square. Such connected clusters may correspond to dots of colorant used according to halftoning to fill the space in a manner that the human eye perceives as a solid color, wherein halftones having more or less intensity are realised by greater or smaller densities of dots of colorant.

Since pixels to be printed with the first colorant are clustered together, so are "available" pixels that are not printed with the first colorant and may be printed with a further colorant without a reduced ink efficiency due to interferences between the first colorant and the further colorant. Thus, pixels having a tonal value of 0 form blank spaces or "gaps" between the groups of pixels to be printed with first colorant, i.e. between dots of the first colorant, such that dots of a further colorant of a bigger size may be printed therein. This way, the ink efficiency for printing colors having a blackness greater than 33% can also be improved.

In order to increase the darkness level in one unit with respect to a smaller darkness level, which may be equivalent to increasing the ratio of the sum of the tonal values of all pixels to the number of pixels by a number equal to 1 over the number of pixels in the variety of pixels, the tonal value of one pixel is increased by 1. According to the principle of maximizing the number of pixels having the minimal tonal value, the tonal value of a pixel having a tonal value greater than the minimal tonal value assigned to a pixel is increased by 1 rather than increasing by 1 the tonal value of a pixel having the minimal tonal value, as long as the aforementioned conditions regarding the predefined threshold and the predefined maximal value remain fulfilled. Thus, when distributing the tonal values over the pixels according to a given target darkness level pixels having a value greater than the minimal tonal value are adjacent to each other.

This does however not extend to all pixels of the halftone screen, i.e. tonal values are not distributed such that a halftone screen contains a connected group of pixels having the minimal tonal value and another connected group of pixels having a tonal value greater than the minimal tonal value. Instead, this condition is understood to extend to pixels in a subregion of the halftone screen of a size such that average quantities defined within said subregion are equivalent to average quantities defined for the entire halftone screen. In other words, the groups of mutually adjacent pixels having a tonal value greater than the minimal tonal value correspond to dots of colorant to be distributed over a printing medium in order to convey the human eye the impression of a given color according to the principles of halftoning.

For instance, the left middle square illustrates both in FIG. 1 and in FIG. 2 a darkness level that corresponds to a printing density of the first colorant of ¼ dpp. However, in the comparative example of FIG. 1, 12 pixels would be left unprinted in a region of a printing medium represented by the square under consideration, whereas according to the example shown in FIG. 2, 14 pixels would be left unprinted and could hence be printed with a further colorant without suffering from ink inefficiency due to color interferences between the first colorant and the further colorant or at least suffering from such interferences to a minimal degree.

The bottom right square in FIG. 1 corresponds to a darkness level that in the example shown is indicative of a printing density of 1 dpp of the first colorant. Assuming that 100% color is achieved with a printing density of 3 dpp of the first colorant, a part of a printing medium printed according to a halftone screen entirely corresponding to the darkness level illustrated by the bottom right square would be printed with 33% blackness (gray) assuming a linear relationship between blackness and the printing density of the first colorant. Note however, that the relationship between blackness and printing density may be other than linear. In this example, there would remain no unprinted pixels and colorant depositions of a further colorant would have to be printed on pixels already containing one colorant deposition of the first colorant in an ink inefficient manner.

Contrary to this, the bottom right square of FIG. 2, which also corresponds to a printing density of the first colorant of 1 dpp, there are still pixels having the minimal tonal value of 0, which are hence to be left unprinted with the first colorant and may be printed with a further colorant in an ink efficient manner. Thus, colorant depositions of a further colorant may be printed in unprinted pixels, i.e. blank pixels, to form dots of further colorant in order to realize a given color according to halftoning techniques with an increased ink efficiency.

The example illustrated in FIG. 2 hence provides for a halftone screen according to which a printing medium may be printed with a first colorant in a way that, for a given printing density of the first colorant, minimizes the number of pixels that are to be printed with the first colorant according to the halftone screen. With respect to the comparative example described with reference to FIG. 1, this method allows achieving a printing density of the first colorant while maximizing the number of pixels that are not to be printed with first colorant and hence remain available for being printed with a further colorant, thereby avoiding or at least minimizing the extent to which the first colorant overlaps with further colorants and possibly affects their ink efficiency. When the first colorant corresponds to a black colorant, the method allows for a minimized interference of black colorant with further colorants thereby increasing ink efficiency. The method hence provides for increased ink efficiency for halftone printing.

In an example, a target halftone screen may be generated from a reference halftone screen by incrementally modifying the distribution of tonal values in the reference halftone screen such that the darkness level be increased. The reference halftone screen may correspond to a first darkness level and the target halftone screen may correspond to a second darkness level, wherein the second darkness level is greater than the first darkness level. With reference to the example shown in FIG. 2, a target halftone screen corresponding to a printing density of ⅜ dpp (cf. middle right square) may be obtained from a reference halftone screen corresponding to a printing density of 5/16 dpp (cf. middle square).

For generating the target halftone screen, the tonal values of the pixels of the reference halftone screen may be assumed. In order to increase the darkness level by 1, the tonal value of a selected pixel of the reference halftone screen is increased by 1. If the selected pixel has a tonal value of 0 or 1, it is a pixel adjacent to a pixel having a tonal value of 2, but from the case in which the tonal value of a square is increased for the first time and there are no pixels in the square having a tonal value greater than 0. If the selected pixel has a tonal value of 2, it is a pixel adjacent to a pixel having a tonal value of 2. This corresponds to a case in which all pixels in a square already have a tonal value of at least 2, i.e. to a ratio of the sum of the tonal values in a square to the number of pixels in the square equal to or greater than 2.

In the example explained above, the darkness level of the reference halftone screen is incrementally modified to generate the target halftone screen by increasing the tonal value of one selected pixel of the reference halftone screen by 1. The target halftone screen thus generated and the reference halftone screen correspond to consecutive darkness values. However, the target halftone screen may also be generated from the reference halftone screen by increasing the tonal values of more than one selected pixels of the reference halftone screen by 1 or more, such that the reference halftone screen and the target halftone screen correspond to non-consecutive darkness values. For instance any of the squares shown in the example of FIG. 2 could be generated as a target halftone screen from any of the other squares. Further, it is also possible to generate a target halftone screen corresponding to a darkness values smaller than the darkness value of the reference halftone screen by reducing the tonal value of more than one selected pixels of the reference halftone screen.

Generating a halftone screen as a target halftone screen from a reference halftone screen allows for a quick and computationally efficient data generation from preexisting data. Further, since different halftone screens corresponding to different darkness levels may be easily generated, there is no need to store a separate data set or halftone screen for each possible darkness level so that storage space requirements can be reduced.

Figure 3:
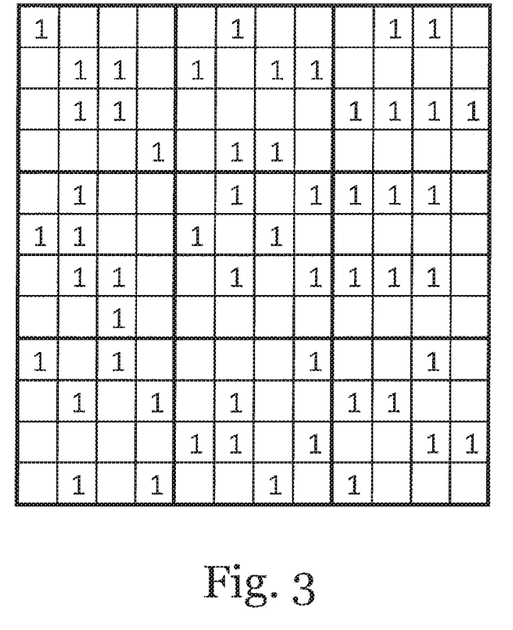
FIG. 3 is a schematic illustration of a halftone screen for a darkness level as employed in a halftoning printing method.
Figure 4:
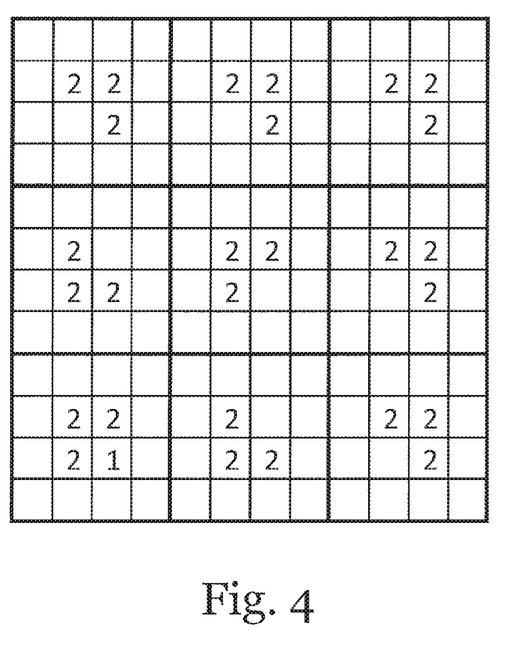
FIG. 4 is a schematic illustration of a halftone screen for a darkness level employed in a method of generating data representing a halftone screen according to an example.

The improved ink efficiency achieved by the method disclosed herein may be better understood by comparing FIGS. 3 and 4. FIG. 3 shows a schematic illustration of a comparative example of a halftone screen corresponding to a printing density for a first colorant of ⅜ dpp described herein for reference. FIG. 4 shows a schematic illustration of a halftone screen corresponding to the same printing density for a first colorant of FIG. 3 but in a data configuration generated according to an example of a method for generating data representing a halftone screen. Both the halftone screen of FIG. 3 and that of FIG. 4 represent the same darkness level or printing density for the first colorant and could hence not be distinguished by the human eye, which perceives the same level of "blackness" in both cases.

As seen in the figures, the halftone screen generated according to the example illustrated in FIG. 4 allows for an increased number of pixels having the minimum tonal value of 0. Further, the pixels having a tonal value greater than the minimal tonal value are clustered together forming dots of the first colorant. Consequently, there are bigger connected regions of pixels having the minimal tonal value of 0 in which colorant depositions of a further colorant, which may for instance be cyan, magenta or yellow, could be deposited without the first colorant, i.e. the black colorant, and the further colorant interfering with each other in a way that would reduce ink efficiency.

A situation analogous to that described with reference to FIGS. 3 and 4 applies to colors having a blackness greater than about 66%. This corresponds to a printing density for the first colorant greater than 2 dpp. In this situation, assuming a linear relationship between blackness and printing density of the first colorant, the minimal tonal value assigned to pixels of the first subset would be 2 and no pixel would have a tonal value of 0 or 1. According to the example illustrated in FIG. 4, pixels having a tonal value greater than 2, i.e. a tonal value of 3, would form clusters of black dots surrounded by connected regions of pixels having the minimal tonal value of 2 in which colorant depositions of a further colorant could be deposited with a minimized degree of interference between the first colorant and the further colorant.

Figure 5:
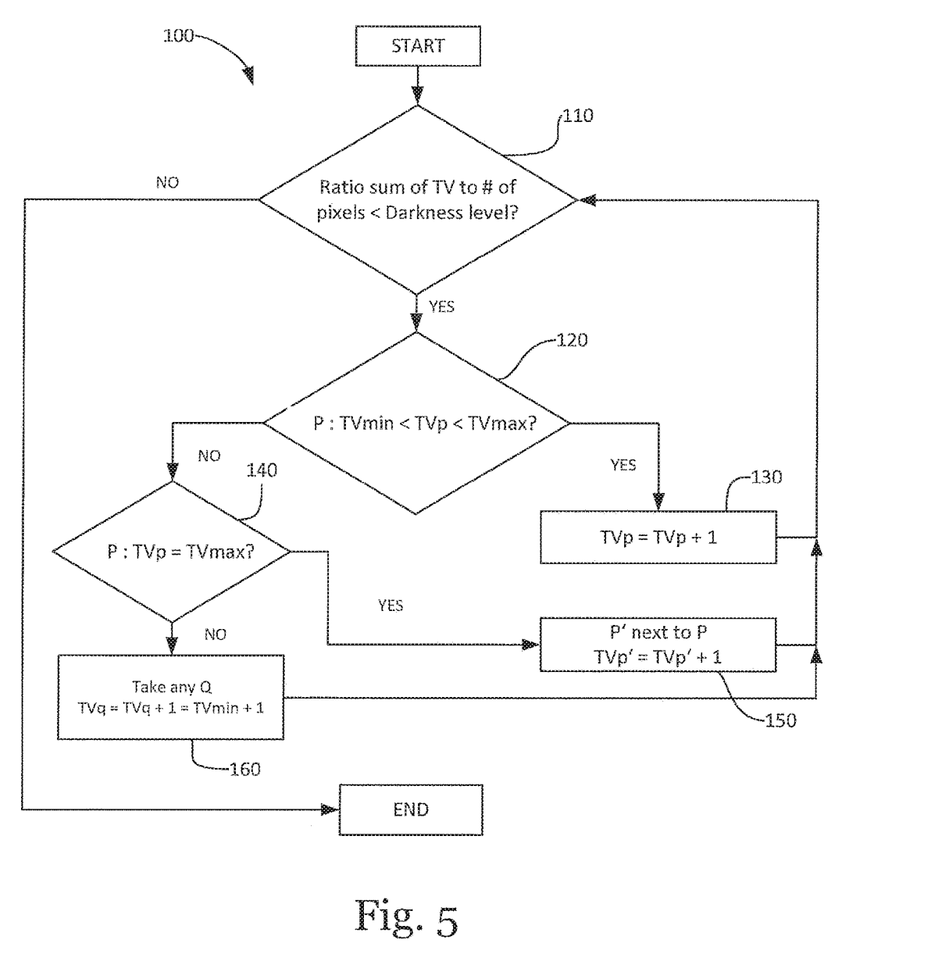
FIG. 5 is a schematic flow diagram of a method of generating data representing a halftone screen according to an example.

FIG. 5 shows a schematic flow diagram of an example of a method of generating data representing a halftone screen according to the present disclosure. This example may be encoded in the form of computer-executable instructions that, when executed by a processor, cause the processor to carry out a process 100 in order to perform the method disclosed herein. The process 100 can be applied to each of the "squares" or subregions of a halftone screen defined and described above and illustrated in the foregoing figures.

The process 100 starts with a verification condition no of whether the ratio of the sum of the tonal values to the number of pixels is equal to or smaller than a larger darkness level to be represented by the halftone screen. If this is the case, the process 100 is terminated.

If the verification condition no is not fulfilled, the process continues with at 120 checking whether there is any pixel P having a tonal value TVp greater than the minimal tonal value assigned to pixels of the first subset TVmin and smaller than the maximal tonal value assigned to pixels of the first subset TVmax. If this is the case, operation 130, in which the tonal value TVp of the pixel P is increased by 1, is carried out and the process 100 goes back to 110.

Otherwise, it is checked 140 whether there is any pixel P having a tonal value TVp equal to the maximal tonal value assigned to pixels of the first subset TVpmax. If that is the case, the tonal value TVp' of a pixel P' adjacent to the pixel P is increased by 1 at 150 and the process 100 goes back to 110.

Otherwise, an operation 160 is carried out, in which a pixel Q of the square is selected and the tonal value TVq of the pixel Q, which corresponds to the minimal tonal value assigned to pixels of the first subset TVmin is increased by 1. The pixel Q may be a pixel randomly selected from along the pixels of a subregion corresponding to one of the squares illustrated in the foregoing figures. The process 100 then goes back to block 110. The operation 160 corresponds to the creation of a first vanishing tonal value within a square or subregion.

The sequence described above can be cyclically repeated until the condition 110 is no longer fulfilled, which indicates that the target darkness level has been achieved. The process 100 is then terminated.

In an example, the method may further comprise generating color data of a further colorant for the plurality of pixels according to a color level by assigning a color value to at least a second subset of the plurality of pixels. The second subset may partially or totally overlap with the first subset or not, and wherein the second subset may totally overlap with the plurality of pixels or not.

The color level may specify the printing density of the further colorant to be printed on a printing medium according to the halftone screen, i.e. the number of colorant depositions of further colorant to be printed on the printing medium per pixel on average. The color level is hence related to a ratio of the sum of the color values of all pixels of the plurality of pixels to the number of pixels of the plurality of pixels, and is analogous to the darkness level but may refer to a further colorant other than the first colorant.

This may apply to one or more further colorants, such as three further colorants, which may correspond to cyan, magenta and yellow, such that the halftone screen may be based on a CMYK color scheme. In that case, the method further comprises generating color data of 3 further colorants. However, other numbers of further colorants and other color schemes may be employed and are included in this disclosure.

Figure 6:
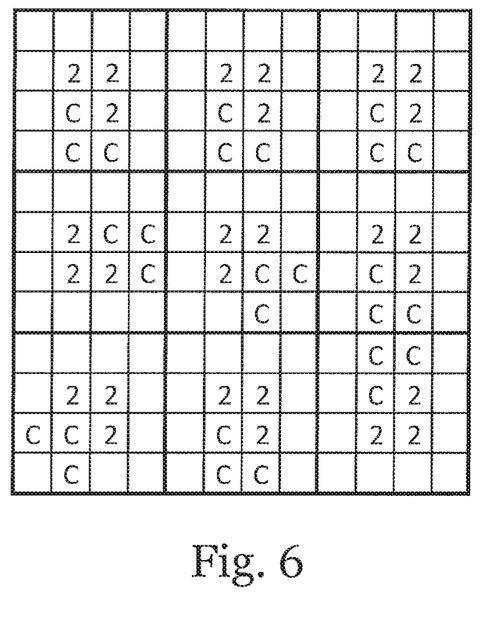
FIG. 6 is a schematic illustration of a halftone screen according to an example.

FIG. 6 is a schematic illustration of a halftone screen generated by a method according to an example that further comprises generating color data of a further colorant other than the first colorant. In the example shown, the first colorant corresponds to a black colorant and the further colorant may correspond to any of a cyan, magenta or yellow colorant. The tonal values are represented by Arabic numerals and a color value is represented by the letter C (for color).

The tonal values of the pixels of the second subset are smaller than the predefined maximal value, which in the example shown in FIG. 6 corresponds to a tonal value of 3. This ensures that no color value is assigned to pixels having a tonal value equal to the predefined maximal value, such that when the halftone screen is used for printing a printing medium with a printing liquid corresponding to the first colorant and with a further printing liquid corresponding to the further colorant, no colorant depositions of the further colorant are deposited on pixels which are to be printed with a number of colorant depositions of the first colorant corresponding to the predefined maximal value. Such depositions would have little ink efficiency and would hence imply a waste of printing liquid that is avoided by the method disclosed herein.

Further, the sum of the tonal values of the pixels of the second subset is minimized. This implies that when distributing the color values over the pixels according to a color level, pixels having lower tonal values are included in the second subset rather than pixels having higher tonal values. According to the principle of minimizing the sum of the tonal values of the pixels of the second subset, the color value of a first pixel having a first tonal value increased by 1 rather than increasing the color value of a second pixel having a second tonal value if the first tonal value is greater than the second tonal value. With reference to the examples considered above with respect to FIGS. 1 to 4, this implies that color values are assigned if possible to pixels having a tonal value of 0, i.e. to blank pixels that are not to be printed with the first colorant. If this is not possible, color values are assigned to pixels having a tonal value of 1. Pixels having a tonal value of 2 are assigned a color value if no pixels having a tonal value smaller than 2 are available and are not assigned a tonal value of 2 in all other cases.

This ensures that, when generating a color according to halftoning techniques, dots of the further colorant, which may for instance correspond to dots of a cyan, magenta or yellow color are placed if possible in blank areas between dots of the first colorant, which corresponds to a black colorant. If no blank areas are available, dots of the further colorant are placed in "grey" areas between dots of the first colorant. A "grey" area corresponds to a cluster of pixels having a tonal value between the lowest possible tonal value, which in the examples described above corresponds to a tonal value of 0, and the predefined maximal value, which in the examples described above correspond to a tonal value of 3.

Figure 7:
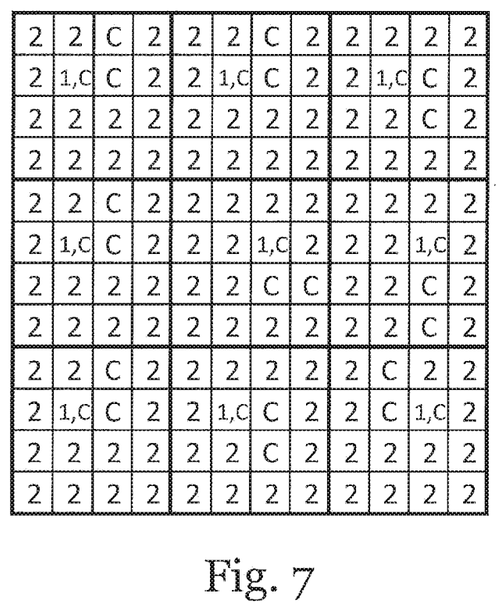
FIG. 7 is a schematic illustration of a halftone screen according to another example.

This may also be seen in the example of a halftoning screen illustrated in FIG. 7. The color values are assigned to pixels having the minimal tonal value of 0 and to pixels having a tonal value of 1 rather than to pixels having a tonal value of 2. This way the degree to which the first colorant may interfere with a further colorant and reduce the ink-efficiency thereof can be minimized.

In an example, a computer-readable storage medium is provided comprising computer-executable instructions which, when executed by a processor, cause the processor to perform a method according to any of the examples described above.

In a further example, an apparatus is provided that comprises a processor, a memory and a printing device. The memory stores computer-executable instructions which, when executed by the processor, cause the processor to perform a method according to any of the examples described above.

The printing device is a device to print a printable medium with a printing fluid according to the generated tonal data. The printing device may for example correspond to an industrial printer or to a household printer. The printing device may leave pixels having the minimal tonal value unprinted with the first colorant.

Figure 8:
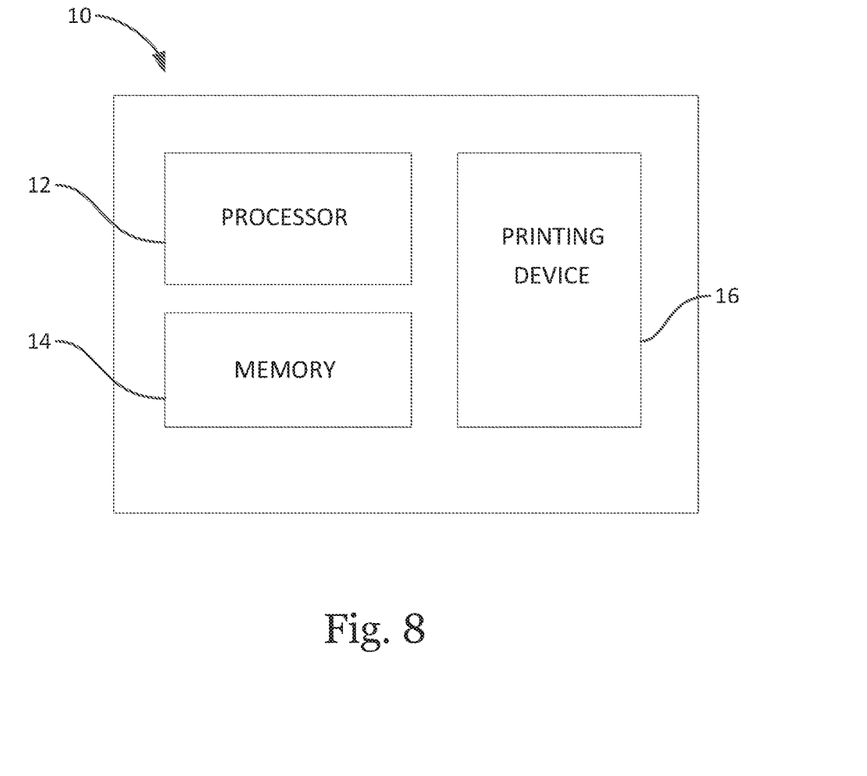
FIG. 8 is a schematic illustration of components of an apparatus in accordance with an example.

FIG. 8 is a schematic illustration of an apparatus 10 according to an example. The apparatus 10 comprises a processor 12, a memory 14, and a printing device 16. The memory 14 stores computer-executable instructions which, when executed by the processor 12, cause the processor 12 to perform a method according to any of the examples described above to generate tonal data of a first colorant.

The printing device 16 prints a printing medium with a first priming fluid corresponding to the first colorant according to the generated tonal data. The printing device 16 may print a pixel on the printing medium with a number of colorant depositions equal to the tonal value of a corresponding pixel of the halftone screen. In the example shown, the first printing fluid is a black printing fluid. In the example shown, the tonal values may take values equal to 0, 1, 2, or 3, wherein the predefined threshold is 2 and the predefined maximal value is 3. The printing device 16 does not print with first colorant pixels having the minimal tonal value of 0.

The method performed by the processor 12 when executing the computer-executable instructions stored in the memory 14 may further cause the processor to perform a method comprising generating color data of at least a further colorant for the plurality of pixels according to the examples described above. In that case, the printing device 16 further prints a printable medium with a further colorant according to the generated color data, wherein the further colorant corresponds to a further printing fluid other than the first printing fluid, like for example a printing fluid of any of the colors cyan, magenta or yellow.

Specific examples of a method of generating data representing a halftone screen and of an apparatus according to the present disclosure have been described herein in greater detail with reference to FIGS. 1 to 8. However, the description of the examples in the figures merely serves to illustrate the disclosure and should not be construed to imply any limitation. The scope of the disclosure is to be determined based on the appended claims.

The invention claimed is:

1. A method of generating data representing a halftone screen, the method comprising:
generating tonal data of a first colorant for a plurality of pixels according to a darkness level by assigning a tonal value to at least a first subset of the plurality of pixels, wherein said tonal value takes a value equal to any of a plurality of ordered tonal values, wherein a difference between a maximal tonal value and a minimal tonal value assigned to pixels of the first subset is equal to or smaller than a predefined threshold; and wherein, for a given darkness level, a number of pixels with the minimal tonal value is maximized;
wherein the darkness level is related to a ratio of a sum of the tonal values of all pixels of the plurality of pixels to a number of pixels of the plurality of pixels; wherein a pixel having a tonal value greater than the minimal tonal value assigned to pixels of the first subset is adjacent to a pixel having at least the same tonal value; and wherein the tonal value of every pixel is equal to or smaller than a predefined maximal value.

2. The method of claim 1, wherein the first colorant is a black colorant.

3. The method of claim 1, wherein the tonal value takes a value equal to any of first to fourth ordered tonal values, wherein the predefined threshold is smaller than the predefined maximal value; and wherein a pixel can take a tonal value greater than the predefined threshold if all pixels in the first subset have a tonal value equal to or greater than the predefined threshold.

4. The method of claim 1, wherein the method further comprises generating color data of a further colorant for the plurality of pixels according to a color level by assigning a color value to at least a second subset of the plurality of pixels, wherein the tonal values of the pixels of the second subset are smaller than the predefined maximal value, wherein a sum of the tonal values of the pixels of the second subset is minimized, wherein the color level is related to a ratio of a sum of color values of all pixels of the plurality of pixels to a number of pixels of the plurality of pixels.

5. The method of claim 1, wherein the tonal value of a pixel corresponds to a number of colorant depositions of the first colorant to be deposited on a corresponding pixel of a printing medium.

6. The method of claim 1, wherein a target halftone screen corresponding to a second darkness level corresponding to a second ratio of a sum of the tonal values of all pixels of the plurality of pixels to a number of pixels of the plurality of pixels is generated starting from a reference halftone screen corresponding to a first darkness level corresponding to a first ratio of a sure of the tonal values of all pixels of the plurality of pixels to a number of pixels of the plurality of pixels, wherein the second ratio is greater than the first ratio.

7. The method of claim 6, wherein the tonal value takes a value equal to any of 0, 1, 2, or 3, wherein the predefined threshold is 2, and wherein the predefined maximal value is 3; wherein the sum of the tonal values of all pixels of the target halftone screen exceeds the sum of the tonal values of all pixels of the reference halftone screen by 1, and wherein the target halftone screen is generated from the reference halftone screen by increasing the tonal value of one selected pixel of the reference halftone screen by 1.

8. The method of claim 7, wherein the selected pixel has a tonal value of 0 or 1 and is adjacent to a pixel having a tonal value of 1 or 2; or
   wherein the selected pixel has a tonal value of 2 and is adjacent to a pixel having a tonal value of 2, wherein the second ratio is equal to or grater than 2.

9. A non-transitory computer-readable storage medium comprising computer-executable instructions which, when executed by a processor, cause the processor to perform a method of generating data representing a halftone screen, wherein the method comprises:
   generating tonal data of a first colorant for a plurality of pixels according to a darkness level by assigning a tonal value to at least a first subset of the plurality of pixels, wherein said tonal value takes a value equal to any of a plurality of ordered tonal values, wherein a difference between a maximal tonal value and a minimal tonal value assigned to pixels of the first subset is equal to or smaller than a predefined threshold; and wherein, for a given darkness level, a number of pixels with the minimal tonal value is maximized,
   wherein the darkness level is related to a ratio of a sum of the tonal values of all pixels of the plurality of pixels to a number of pixels of the plurality of pixels; wherein a pixel having a tonal value greater than the minimal tonal value assigned to pixels of the first subset is adjacent to a pixel having at least the same tonal value; and wherein the tonal value of every pixel is equal to or smaller than a predefined maximal value.

10. The non-transitory computer-readable storage medium of claim 9, wherein the non-transitory computer-readable storage medium further stores data sets representing halftone screens corresponding to different darkness levels.

11. The non-transitory computer-readable storage medium of claim 9, wherein the non-transitory computer-readable storage medium further stores at least one data set representing at least one stored halftone screen respectively corresponding to at least one predefined darkness level, and wherein the computer-executable instructions, when executed by the processor, further cause the processor to generate further halftone screens from the at least one stored halftone screens.

12. The non-transitory computer-readable storage medium of claim 9, wherein the method further comprises generating color data of a further colorant for the plurality of pixels according to a color level by assigning a color value to at least a second subset of the plurality of pixels, wherein tonal values of the pixels of the second subset are smaller than the maximal tonal value, wherein a sum of the tonal values of the pixels of the second subset is minimized, wherein the color level is related to a ratio of a sum of color values of all pixels of the plurality of pixels to a number of pixels of the plurality of pixels.

13. An apparatus comprising:
   a processor; and
   a memory storing computer-executable instructions which, when executed by the processor, cause the processor to generate tonal data of a first colorant for a plurality of pixels according to a darkness level by assigning a tonal value to at least a first subset of the plurality of pixels; and
   a printing device to print on a printing medium with a printing fluid corresponding to the first colorant according to the generated tonal data;
   wherein pixels of a halftone screen correspond to pixels printed on the printing medium;
   wherein the printing device prints a pixel on the printing medium with a number of colorant depositions equal to the tonal value of a corresponding pixel of the halftone screen, wherein the number of colorant depositions is one of 0, 1, 2, or 3; wherein a difference between a maximal number of colorant depositions and a minimal number of colorant depositions to be primed in a pixel on the printing medium is equal to or smaller than 2; wherein, for a given darkness level, a number of pixels on the printing medium to be printed with a number of colorant depositions equal to a minimal tonal value is maximized; wherein the darkness level is related to a ratio of a sum of colorant depositions to be printed on a part of the printing medium represented by the halftone screen; to a number of pixels in the part of the printing medium represented by the halftone screen; and wherein a pixel to be printed with a number of colorant depositions equal to or greater than the minimal tonal value assigned to pixels of the first subset is adjacent to a pixel to be printed with at least the same number of colorant depositions.

14. The apparatus of claim 13, wherein the printing fluid is a black colorant.

15. The apparatus of claim 13, wherein the instructions, when executed by the processor, further cause the processor to generate color data of at least a further colorant for the plurality of pixels according to a color level by assigning a color value to at least a second subset of the plurality of pixels;
   wherein the printing device further prints on the printing medium with a further printing fluid corresponding to the further colorant according to the generated color data; wherein the printing device prints a pixel on the printing medium with a number of depositions of the further colorant equal to the color value of a corresponding pixel of the halftone screen, wherein tonal values of the pixels of the second subset are smaller than a maximal tonal value, wherein a sum of the tonal values of the pixels of the second subset is minimized, wherein the color level is related to a ratio of a sum of color values of a pixels of the plurality of pixels to a number of pixels of the plurality of pixels.

* * * * *

UNITED STATES PATENT AND TRADEMARK OFFICE
CERTIFICATE OF CORRECTION

PATENT NO.           : 10,389,914 B2                              Page 1 of 1
APPLICATION NO.      : 15/991118
DATED                : August 20, 2019
INVENTOR(S)          : Alex Veis It is certified that error appears in the above-identified patent and that said Letters Patent is hereby corrected as shown below:

In the Claims

In Column 10, Line 51, Claim 4, after "wherein" delete "the".

In Column 10, Line 67, Claim 6, delete "sure" and insert -- sum --, therefor.

In Column 11, Line 17, Claim 8, delete "grater" and insert -- greater --, therefor.

In Column 11, Line 54, Claim 11, delete "screens." and insert -- screen. --, therefor.

In Column 12, Line 22 (approx.), Claim 13, delete "3;" and insert -- 3, --, therefor.

In Column 12, Line 25 (approx.), Claim 13, delete "primed" and insert -- printed --, therefor.

In Column 12, Line 32 (approx.), Claim 13, delete "screen;" and insert -- screen --, therefor.

In Column 12, Line 58 (approx.), Claim 15, delete "a" and insert -- all --, therefor.

Signed and Sealed this
Thirty-first Day of December, 2019

Andrei Iancu
*Director of the United States Patent and Trademark Office*